(12) United States Patent
Leconte et al.

(10) Patent No.: US 8,289,012 B2
(45) Date of Patent: Oct. 16, 2012

(54) SIGNAL TRANSMISSION/RECEPTION DEVICE

(75) Inventors: Eric Leconte, Créteil Cedex (FR);
Stéphane Violleau, Créteil Cedex (FR);
Michael Notarianni, Créteil Cedex (FR)

(73) Assignee: Valeo Securite Habitacle, Créteil Cedex (FR)

( * ) Notice: Subject to any disclaimer, the term of this patent is extended or adjusted under 35 U.S.C. 154(b) by 563 days.

(21) Appl. No.: 12/520,788

(22) PCT Filed: Dec. 21, 2007

(86) PCT No.: PCT/EP2007/064418
§ 371 (c)(1),
(2), (4) Date: Jan. 22, 2010

(87) PCT Pub. No.: WO2008/077919
PCT Pub. Date: Jul. 3, 2008

(65) Prior Publication Data
US 2010/0148749 A1 Jun. 17, 2010

(30) Foreign Application Priority Data
Dec. 22, 2006 (FR) ..................................... 06 11323

(51) Int. Cl.
*G01R 19/00* (2006.01)
*G01R 27/08* (2006.01)
(52) U.S. Cl. ..................................... 324/76.11; 324/713

(58) Field of Classification Search ............... 324/76.11, 324/713
See application file for complete search history.

(56) References Cited

U.S. PATENT DOCUMENTS

| 6,161,070 | A  | * | 12/2000 | Jinno et al. ....................... 701/45 |
| 6,208,249 | B1 |   | 3/2001  | Saito et al. |
| 2004/0090234 | A1 |   | 5/2004 | Macune |
| 2005/0093760 | A1 | * | 5/2005 | Rochelle et al. ............... 343/867 |

FOREIGN PATENT DOCUMENTS

| GB | 2 415 785 A | 1/2006 |
| WO | 00/44077 | 7/2000 |
| WO | 03/055005 A1 | 7/2003 |

OTHER PUBLICATIONS

International Search Report for PCT/EP2007/064418 mailed Apr. 2, 2008 (3 pages).

* cited by examiner

Primary Examiner — Amy He
(74) Attorney, Agent, or Firm — Osha Liang LLP (57) ABSTRACT

The invention relates to a signal transmission/reception device (DER) which can cooperate with an antenna device (A) capable of emitting a magnetic field. The invention is characterized in that the device (DER) comprises the following elements for transmission, namely: a power stage (P) for sending a symmetrical square-wave voltage signal (U0) to the input of the antenna device (A) in order to supply same with a current that can be used to generate the emitted magnetic field; and a current measuring stage (C) for measuring the current circulating in the antenna device (A). The invention is suitable for motor vehicles.

9 Claims, 7 Drawing Sheets

SIGNAL TRANSMISSION/RECEPTION DEVICE

FIELD OF THE INVENTION

The present invention relates to a signal transmission-reception device able to cooperate with an antenna(s) device able to emit this magnetic field and a method of implementation by the transmission-reception device.

It finds a particular application in respect of a motor vehicle equipped with a hands-free detection system.

PRIOR ART

According to a known prior art, there is in existence a signal transmission-reception device used in a hands-free system for a vehicle application. A hands-free system makes it possible to access a vehicle and to start it by means of a receiver-transmitter without resorting to a mechanical key. The antennas device communicates with a badge which acts as receiver-transmitter so as to detect whether it is situated in proximity to the vehicle, and whether it is situated inside or outside the cabin of the vehicle.

If the badge is situated in proximity, the vehicle is unlocked when the user of the vehicle touches a door handle for example. If the badge is inside the vehicle, the user is authorized to start the vehicle. Communication between the antennas device and the badge is performed by virtue of low-frequency signals transmitted from the antennas device to the badge and by virtue of radiofrequency signals transmitted from the badge to the transmission-reception device. The low-frequency signals are sent with a given transmitted power corresponding to an emitted magnetic field, the badge receiving a corresponding magnetic field whose power received relates to the power transmitted.

A drawback of this prior art is that the power transmitted is not measured accurately and this may cause reception problems between the antenna device and the badge and consequently a problem of detecting the badge by the antennas device.

SUBJECT OF THE INVENTION

The aim of the invention is therefore accurate measurement of the power transmitted by the antenna(s) device so as to establish reliable reception between the antenna(s) device and an identification object.

It therefore proposes according to a first subject a signal transmission-reception device able to cooperate with an antenna(s) device able to emit a magnetic field, characterized in that it comprises for transmission:
 a power stage for sending a symmetric square voltage signal as input to the antenna(s) device so as to provide it with a current making it possible to generate the magnetic field emitted, and
 a current measurement stage for measuring the current flowing in the antenna(s) device.

Thus, as will be seen in detail further on, the symmetric square voltage signal will make it possible to reduce the number of harmonics in the current measured in the antenna(s) device and will make it possible to thus obtain a determination of the magnetic field emitted and therefore of the transmitted power corresponding to the magnetic field received by the identification object which is more accurate without having parasitic currents.

According to nonlimiting embodiments, the device according to the invention exhibits the following additional characteristics.

In a nonlimiting embodiment, the voltage signal comprises a duty ratio of 1/3. This makes it possible to remove the harmonics whose rank is a multiple of 3 in the measured current signal and to thus obtain a more accurate measurement of the current.

In a nonlimiting embodiment, the power stage is with complete-bridge control. This is a simple means of providing the symmetric voltage.

In a nonlimiting embodiment, the measurement stage is a peak detector. This is a simple means for measuring the current.

In a nonlimiting embodiment, the antenna(s) device is an RLC circuit. The latter makes it possible, on the basis of the supply voltage of the antennas device, to directly amplify the current of the antennas device so as to allow emission of an appropriate magnetic field without using voltage feedback control.

According to a second subject of the invention, the invention proposes a signal transmission-reception system comprising an antenna(s) device and a transmission-reception device according to any one of the previous characteristics, it being able to cooperate with the antenna(s) device.

According to a nonlimiting embodiment, the antenna(s) device is an RLC circuit.

According to a third subject, the invention proposes a method of transmitting-receiving signals bound for an antenna(s) device, characterized in that it comprises the steps of:
 sending a symmetric square voltage signal as input to the antenna(s) device so as to provide it with a current making it possible to generate the magnetic field emitted, and measuring the current flowing in the antenna(s) device.

According to a fourth subject of the invention, the invention proposes a motor vehicle characterized in that it comprises a transmission-reception device according to any one of the previous characteristics and able to cooperate with an antenna(s) device.

BRIEF DESCRIPTION OF THE FIGURES

Other characteristics and advantages of the present invention will be better unTRDstood with the aid of the description in conjunction with the drawings, given by way of nonlimiting examples, among which.

DETAILED DESCRIPTION OF NONLIMITING EMBODIMENTS OF THE INVENTION

Figure 1:
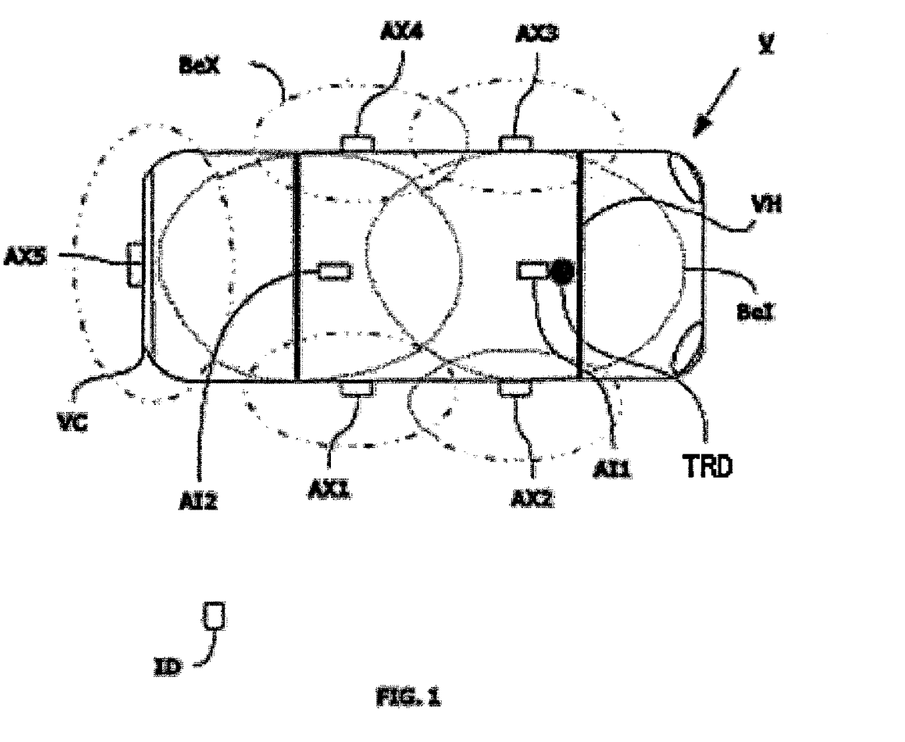
FIG. 1 is a view from above of a vehicle furnished with a hands-free system comprising a transmission-reception device according to a nonlimiting embodiment of the invention.

In FIG. 1, is represented a vehicle V furnished with a signal transmission-reception device comprising:
- a transmission-reception device TRD making it possible to control an antennas device A and
- the antennas device A comprising, in a nonlimiting example, a plurality of antennas, so-called outside antennas AX and so-called inside antennas AI, all of the antennas cooperating with a receiver-transmitter ID, the whole forming a transmission-reception system.

In the nonlimiting example of FIG. 1, are represented five so-called outside antennas AX, four of which are situated outside the cabin VH of the vehicle V, here on the handles of the doors, and one of which AX5 is situated in the rear fenTRD VC of the vehicle. Moreover two so-called inside antennas AI1, AI2 are situated in the cabin VH, here in the front and in the rear of the vehicle. Each antenna is supplied with ac low-frequency current I by the transmission-reception device TRD and emits a magnetic field, dubbed BeI for the inside antennas and BeX for the outside antennas.

By means of their respective emitted magnetic field Be, the outside antennas AX make it possible to detect whether a receiver-transmitter ID receiver-transmitter is situated in proximity to the vehicle V, in a nonlimiting example at a distance of less than 1.5 m, while the inside antennas AI make it possible to detect whether the receiver-transmitter ID is in the cabin VH of the vehicle. The receiver-transmitter ID, in this application, is an identification object ID carried by a user of the vehicle V, for example a badge, a key, a key holTRD called a "keyfob" etc. The example of the identification badge will be taken by way of example in the subsequent description. By means of the ac current I, the antennas A communicate with the badge ID by sending data by transmitting an LF low-frequency signal and the badge ID responds by transmitting an RF radiofrequency signal. In a nonlimiting example, the LF low-frequency signal lies in the vicinity of 125 kHz and the RF radiofrequency signal lies in the vicinity of 433 MHz. It is possible to drop back down to 20 kHz for the LF low-frequency signal or go as high as a GigaHz for the RF radiofrequency signal as a function of the frequency bands available for various countries (315 MHz for Asia, 868 Mhz for certain European countries or 915 Mhz in America etc.).

As a function of the response, the antennas A determine whether the badge ID is authorized to open the doors of the vehicle, or whether it is authorized to start the vehicle. It will be noted that in a nonlimiting example, in orTRD for the badge ID to be authorized to open the doors, the user must for example touch a door handle. For this purpose, the handles comprise appropriate detectors.

The outside antennas AX make it possible to determine a first zone of communication with the badge ID for authorizing vehicle access. This zone is defined by the magnetic field emitted by said antennas AX. The outside antennas AX must therefore guarantee at least a minimum distance from which the badge ID is authorized to access the vehicle.

The inside antennas AI make it possible to determine a second zone ZO of communication with the badge ID for authorizing starting. This zone is defined by the magnetic field emitted by said antennas AI. The inside antennas AI must therefore guarantee a zone from which the badge ID is authorized to start the vehicle, this zone corresponding in the example taken to the cabin VH of the vehicle V. It will be noted that this zone ZO varies as a function of the variations in the magnetic field emitted Be, these variations being due in particular to the surrounding disturbances such as variations in temperatures, variations in battery voltage of the vehicle etc. which influence the components of the antennas device.

It will be noted that in practice, the magnetic field emitted by these inside antennas AI has a larger coverage than the cabin VH but is limited by the metallic shell of the cabin VH of the vehicle V and escapes through the openings of the windows.

Figure 2:
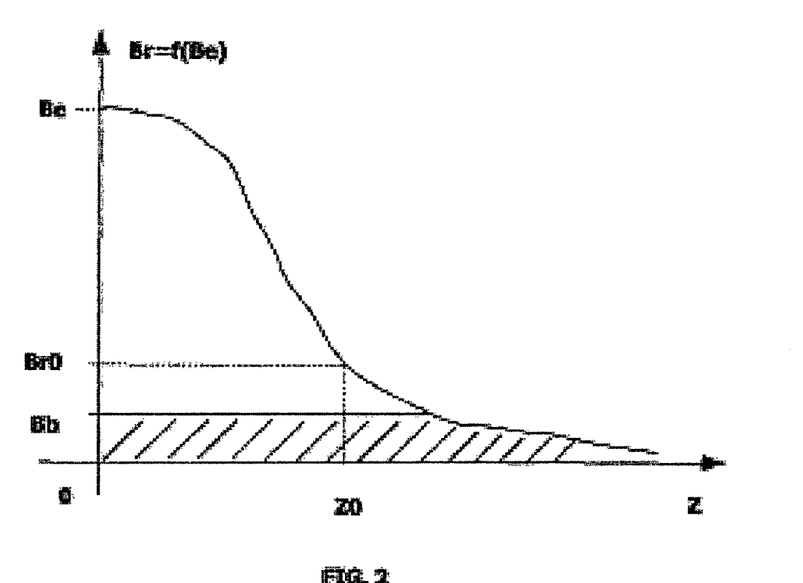
FIG. 2 is a chart representative of a reception of an identification object cooperating with the transmission-reception device according to a nonlimiting embodiment of the invention.

FIG. 2 illustrates the position of the badge ID with respect to an antenna A, here inside AI, of the antennas device as a function of the magnetic field Be of this antenna A. It therefore illustrates the evolution of the corresponding magnetic field Br received.

It may be seen that the further away the badge ID is situated from an antenna A emitting an emitted magnetic field Be, the weaker the corresponding magnetic field received Br. When the badge ID is situated in the same place as the antenna A, the magnetic field received Br is theoretically equal to the magnetic field emitted Be. In FIG. 2 is represented a nominal magnetic field B0 corresponding to the zone ZO of communication in which a badge ID can communicate with an antenna A and the transmission-reception device TRD. When the badge ID is outside this zone ZO (the magnetic field received Br is lower than the nominal magnetic field received B0), the badge ID does not respond to the signals sent by the antennas device A or sends an intentionally erroneous RF radiofrequency response. This implies that it is situated outside the cabin VH of the vehicle. In the converse case, it responds by transmitting an RF radiofrequency signal. It will be noted that this nominal magnetic field B0 is determined so as to avoid the parasitic magnetic fields Bb originating from radio disturbances, as illustrated in FIG. 2, and its value is greater than the value of the parasitic magnetic fields.

The power of the LF low-frequency signals is defined by the ac current I supplying the antennas device A, this power determining the magnetic field emitted Be.

It is recalled that the emitted magnetic field Be of the antennas device A defines the zone ZO that has also been called the communication zone.

$1/d^3$

In a nonlimiting embodiment, the antennas device A is tuned to the transmission frequency (the frequency being for example 125 kHz). This makes it possible to emit a larger amplitude magnetic field at the transmission frequency, and to have a bandpass filter FL. The bandpass filter FL thus makes it possible to reduce the amplitude of the harmonics h (except for the harmonic of rank 1).

Figure 3:
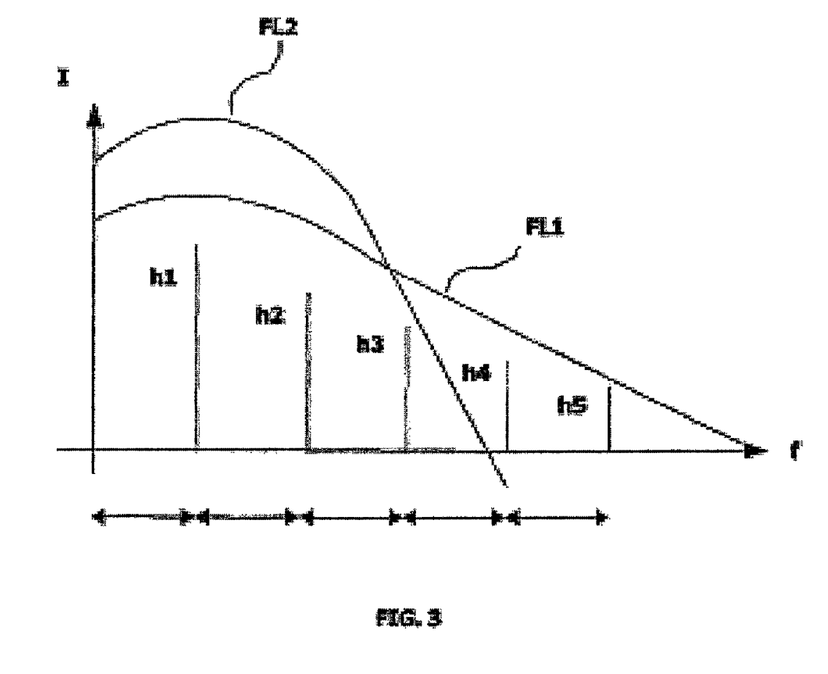
FIG. 3 represents a frequency spectrum of a current flowing in an antennas device of the transmission-reception device according to a nonlimiting embodiment of the invention.

Indeed, on transmission, on the antennas device A side, the value of the current I flowing in the antennas device A is equal to the sum of the harmonics h which are present in the passband of the filter included in the antennas device A. Depending on the selectivity of the filter, all the harmonics will be there if the filter is broadband such as represented at FL1 in FIG. 3, or only some of the harmonics will be there if the filter is narrowband such as represented at FL2 in FIG. 3. On transmission, therefore, the value of the field emitted Be is dependent on this current Irm with harmonics h.

On reception, on the badge ID side, the value of the current which is taken into account is equal solely to the harmonic h1 of rank 1 called the fundamental. Indeed, the magnetic field received Br corresponds to the magnetic field emitted Be at the value of the fundamental only and not at the sum of the harmonics.

Hence, to accurately determine the magnetic field emitted Be by the antennas device A corresponding to the magnetic field received by the badge ID, it is therefore necessary to accurately measure the corresponding power transmitted Pe on the harmonic h1 of rank 1. It is consequently necessary to perform a measurement of current I in orTRD as far as possible to eliminate the harmonics other than the fundamental h1.

Figure 4:
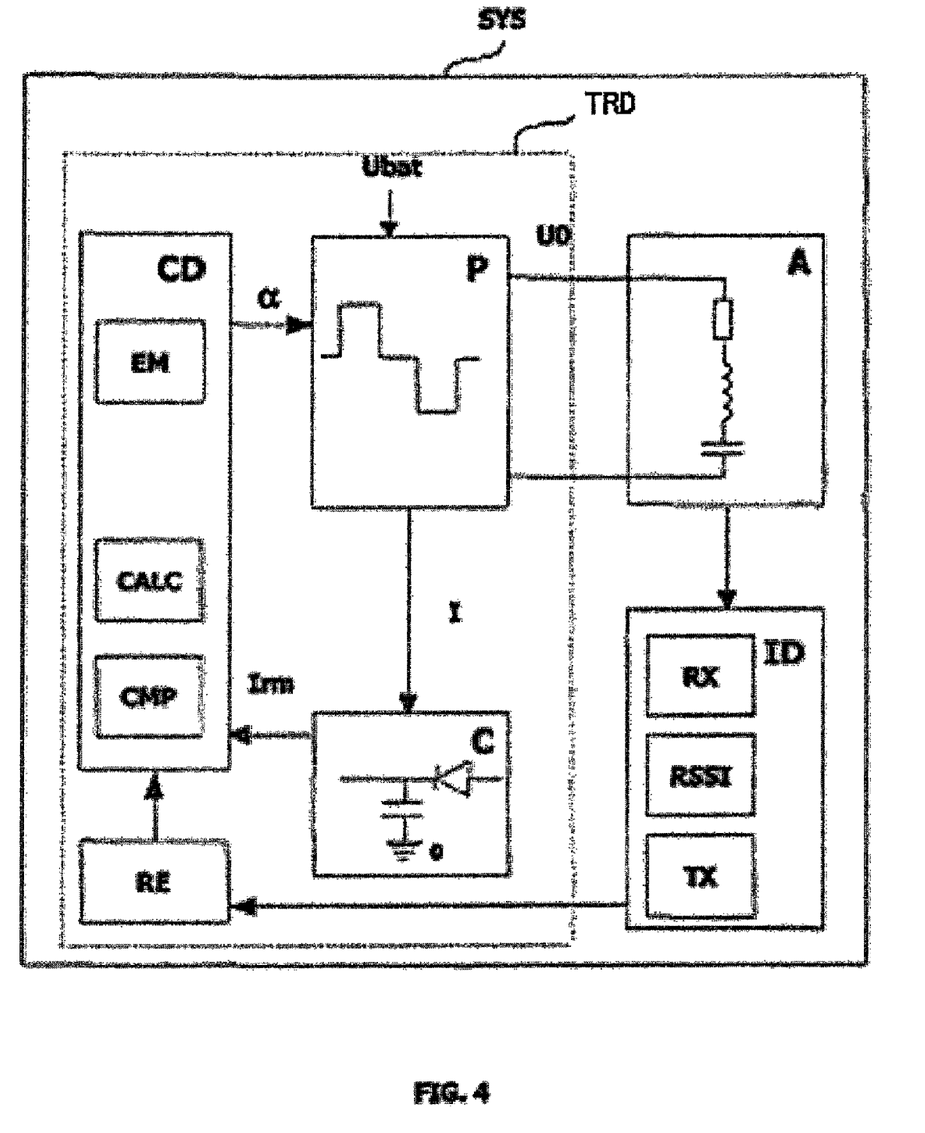
FIG. 4 is a nonlimiting embodiment of a transmission-reception device according to the invention.

This is performed by means of the low-frequency signal transmission-reception device TRD illustrated in FIG. 4 which makes it possible to provide a symmetric square voltage U0 as input to the antennas device A, this making it possible to remove parasitic currents due to the other harmonics as described further on.

The transmission-reception device TRD comprises:
a control device CD,
a power stage P,
a current measurement stage C,
a signal receiver RE for in particular receiving a response from the identification badge ID when it is inside the communication zone ZO.

and cooperates with the antenna(s) device A and with the identification badge ID, the whole forming a transmission-reception system SYS.

It will be noted that according to a nonlimiting embodiment, all the elements of the transmission-reception device TRD are situated on one and the same electronic card. This allows faster and more reliable dialog between these various elements. Conversely, when these elements are separated, the communication links linking them may be more easily disturbed and the throughputs of these links may be lower.

The identification badge ID being known to the person skilled in the art, it is not described here.

The other elements are described in greater detail hereinafter.

The antennas device A.

In a first nonlimiting embodiment, the antennas device A is composed of an RL circuit. The latter makes it necessary to amplify the supply voltage of the antennas device to allow emission of an appropriate magnetic field.

In a second nonlimiting embodiment, the antennas device A is composed of an RLC circuit. The latter makes it possible on the basis of the supply voltage of the antennas device A, which here is the battery voltage Ubat of the vehicle V, to directly amplify the current I flowing in the antennas device A, so as to allow emission of an appropriate magnetic field, without using voltage feedback control. This is therefore a solution which is simpler to implement for obtaining amplification. This RLC circuit also acts as bandpass filter as seen previously.

The control device CD comprises in particular:
a signal transmitter EM for in particular:
transmitting control signals to the power stage P so as to provide the supply voltage Ubat to the antennas device A,
a calculation facility CALC (for example a microprocessor or an ASIC) making it possible in particular to adapt the duty ratio $\alpha 0$ of the symmetric voltage U0 applied to the antennas device A.

In a nonlimiting embodiment, the control device CD can furthermore comprise the signal receiver RE for in particular receiving a response from the identification badge ID when it is inside the communication zone ZO.

The power stage P.

Figure 5:
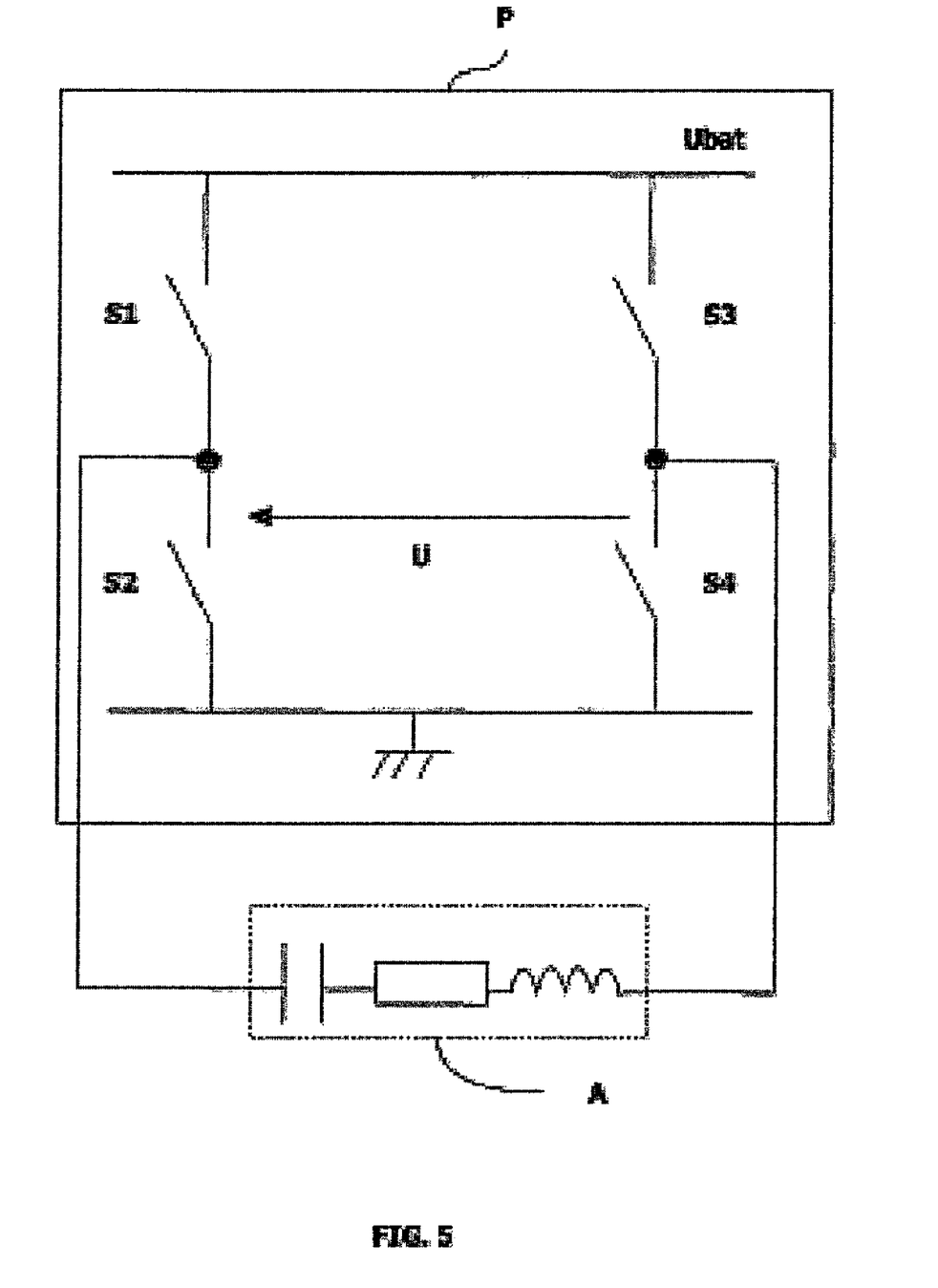
FIG. 5 is a nonlimiting embodiment of a power stage included in the transmission-reception device of FIG. 4.

It provides the symmetric square voltage U0 and allows a measurement subsequently of the current I flowing in the antennas device A while decreasing the effects of the parasitic currents due to the harmonics and therefore subsequently allows accurate generation and accurate measurement of the power transmitted Pe of the corresponding antennas device A on the harmonic h1 of rank 1 while removing parasitic currents due to the other harmonics. It is illustrated in FIG. 5. In a nonlimiting embodiment, it operates by H-bridge with complete-bridge control and is controlled by the control device CD.

It comprises in particular four breakers S1 to S4. In a nonlimiting example these breakers are MOSFET type transistors.

Figure 6:
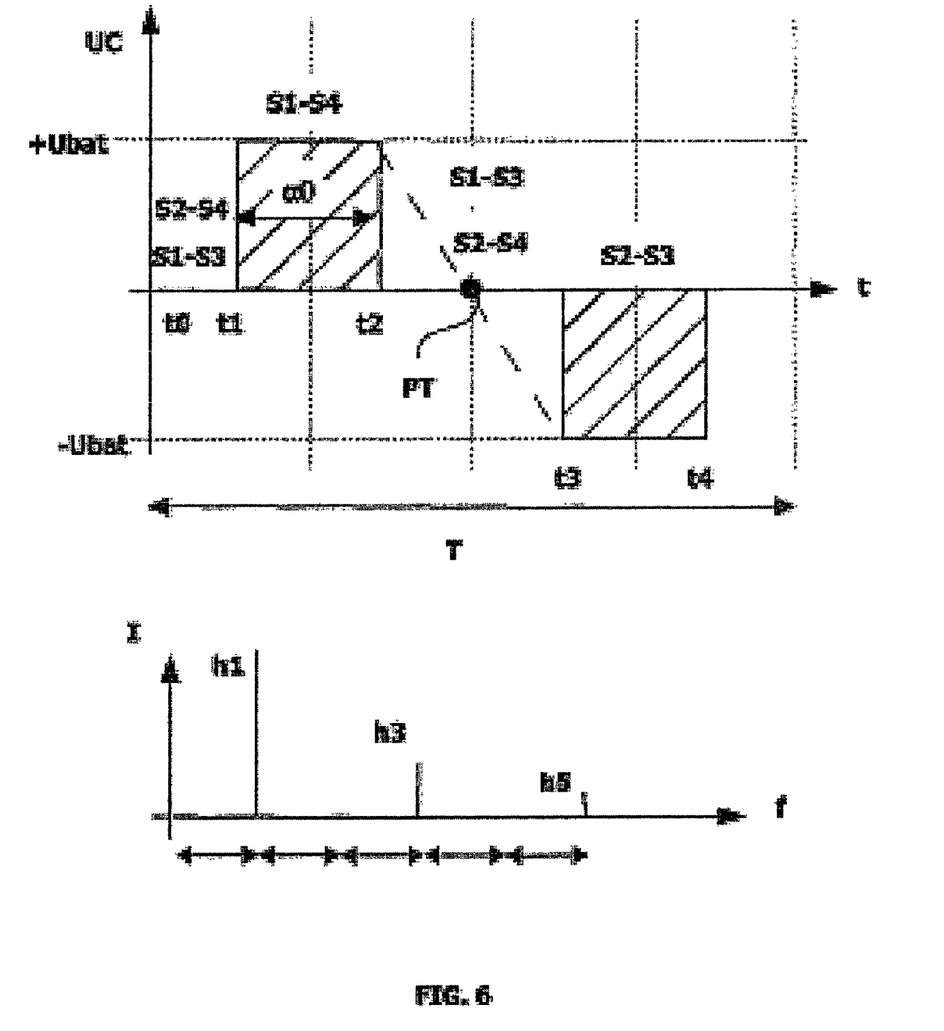
FIG. 6 represents a first embodiment of a voltage signal applied to the antennas device of the transmission-reception device of FIG. 4.

In orTRD to provide the symmetric square voltage U0, the power stage P operates in the following manner, such as illustrated in FIG. 6.

Between the intervals t0-t1 and t2-t3, either all the breakers are open, or the breakers S2 and S4 are closed, or the breakers S1 and S3 are closed, the others being open. The voltage U0 is zero.

Between the interval t1-t2, the breakers S1-S4 are closed, the others being open. The voltage U0 is positive.

Between the interval t3-t4, the breakers S2-S3 are closed, the others being open. The voltage U0 is negative.

The two diagonals of the bridge S2-S3 and S1-S4 are controlled by two control signals delayed with respect to one another by a half-period thus making it possible to obtain symmetry.

The symmetric square voltage U0 of desired duty ratio $\alpha 0$ is thus obtained. As may be seen in FIG. 6, the voltage U0 is symmetric with respect to the point PT, and in this case, the harmonics of even rank of the measured current Irm have been removed.

Indeed, for a representation in terms of frequency, a harmonic of rank n is represented by the term $a_n \cos n\omega t + b_n \sin n\omega t$.

The voltage UC is an odd function, i.e. $f(-x) = -f(x)$, its Fourier series expansion therefore comprises only sine terms, the coefficients $a_n$ being zero.

Thus, knowing that $Cn = (1/T) \int f(x) e^{-jn\omega x} dx$ and $Cn = (1/2)(an - jbn)$ we obtain $Cn = j(2E/\pi n) \cdot \sin(n\pi\alpha 0) \cdot \sin(n(\pi/2))$ and $bn = (4E/\pi n) \cdot \sin(n\pi\alpha 0) \cdot \sin(n(\pi/2))$ with $\omega = 2\pi/T$, with T the period and E the amplitude of the supply voltage Ubat of the antennas device.

The Fourier series corresponding to the symmetric voltage signal U0 is therefore equal to:

$f(x) = \Sigma (4E/\pi n) \cdot \sin(n\pi\alpha 0) \cdot \sin(n(\pi/2)) \cdot \sin n\omega x$, with $n = 1, \ldots, \infty$,
i.e.

$f(x) = \Sigma (4E/(\pi(2p+1)))$.

Figure 7:
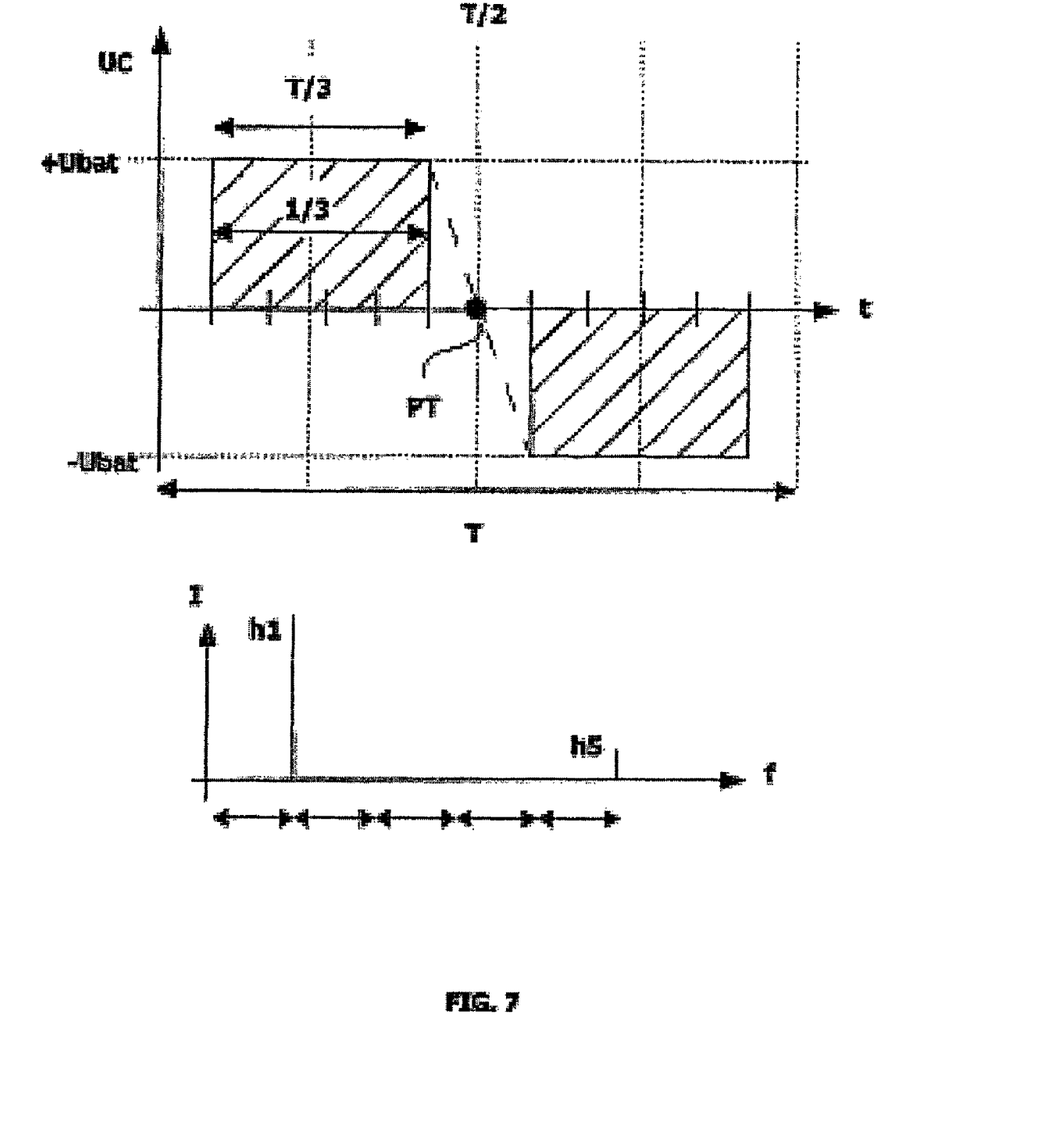
FIG. 7 represents a second embodiment of a voltage signal applied to the antennas device of the transmission-reception device of FIG. 4.

$\sin((2p+1)\pi\alpha 0) \cdot \sin((2p+1)(\pi/2)) \cdot \sin(2p+1)\omega x$, with $p = 0, \ldots, \infty$
this giving the spectrum with the harmonics in FIG. 7.
The value of the fundamental h1 is given by:

$h1 = (4E/\pi) \cdot \sin \pi\alpha 0 \cdot \sin \omega x$ this giving the spectrum with the harmonics in FIG. 6.

Moreover, it will be noted that the fact of having a square voltage avoids energy dissipation in the transistors of the power stage P. Indeed, calorific energy consumption occurs solely during the transition phases, unlike a sinusoidal type voltage where the consumption is markedly greater. This power stage P therefore does not heat up too much.

It will be noted that the value of the alterable duty ratio α0 makes it possible to adjust the value of the power transmitted Pe.

Thus, the square symmetric voltage U0 makes it possible on the one hand to adjust the power transmitted Pe to a desired value corresponding to the desired communication zone ZO (and therefore to accurately generate the power transmitted Pe) and on the other hand to obtain an accurate measurement of the actual power transmitted Pe corresponding to the effective power received of the badge ID since the harmonics of even rank are removed.

In a nonlimiting variant, the voltage U0 comprises a duty ratio of 1/3 which corresponds to a shift of π/3 of the voltage signal UC. As may be seen in FIG. 7, in this case, the harmonics whose rank is a multiple of 3 of the measured current Irm have been removed in addition to the harmonics of even rank thereby consiTRDably limiting the number of harmonics inside the passband of the RLC filter of the antennas device A. This leaves only the harmonics of rank 1 and 5, the latter being negligible.

The current measurement stage C.

In a first embodiment, the current measurement stage or device is a peak amplitude detector. It is a simple means for measuring the current I flowing in the antennas device A. It makes it possible to measure the maximum amplitude of the current, this being sufficient since the troublesome harmonics have been removed through the symmetric control and the duty ratio of 1/3. Thus, this measurement will give the value of the fundamental of this current I. It is made up in a conventional manner of a diode and of a capacitor, such as illustrated in FIG. 4.

It sends the value of the measured current Irm to the calculation facility CALC of the control device CD such as illustrated in FIG. 4.

Of course other means for measuring the current may be used. For example, the current measurement device C may be a digital sampling device or else a device which rectifies the current and then averages the rectified current.

Thus, by virtue of the transmission-reception device TRD described, a current measurement Irm corresponding to the value of the fundamental of the current I flowing in the antennas device A is obtained. The measured current Irm is therefore in this case representative of the amplitude of the fundamental of the magnetic field emitted. Consequently, it is possible to deduce therefrom the power transmitted Pe (and therefore a magnetic field emitted Be) by the antennas device A corresponding accurately to the power received Pr by knowing that the magnetic field emitted Be is proportional to the measured current Irm.

Figure 8:
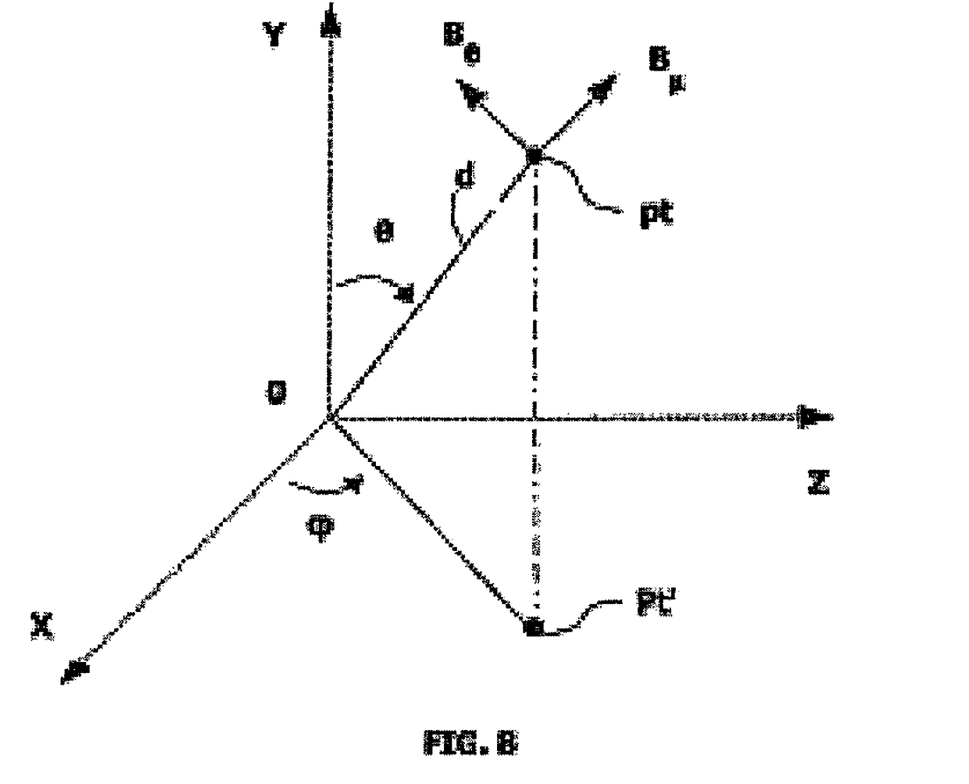
FIG. 8 represents a magnetic field in space of which a component corresponds to a magnetic field emitted by the transmission-reception device according to a nonlimiting embodiment of the invention.
Figure 9:
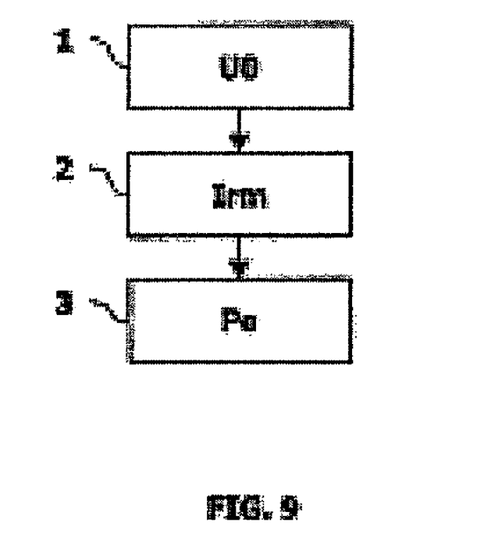
FIG. 9 is a transmission-reception method implemented by the transmission-reception device according to a nonlimiting embodiment of the invention.

It is recalled that in a manner known to the person skilled in the art, a magnetic field B comprises three components in an orthogonal space x, y, z such as are illustrated in FIG. 8 which are the following.

$$B_\mu = (Ae\, Im/2\pi d^3) * \cos\theta,$$

$$B_\theta = (Ae\, Im/4\pi d^3) * \sin\theta, \text{ and}$$

$$B\phi = 0.$$

with Ae the effective surface area of an antenna through which the magnetic field B passes, d the distance which allows a measurement of the magnetic field B from the center of the antenna.

It is also recalled that $Ae = N_w * A * \mu_{rod}$ with $N_w$ the number of turns in the antenna, A the cross section of the ferrite of the turns, and $\mu_{rod}$ the apparent permeability of the ferrite.

The power Pe on transmission is thus known accurately and this will make it possible to control the communication zone ZO between the antennas device A and the badge ID.

It will be noted that it is possible to use the transmission-reception device TRD described for an application in which the badge ID is initialized beforehand with a fixed threshold S0 corresponding to a fixed magnetic field received (the communication zone ZO on transmission is controlled) or for an application in which the badge ID is initialized beforehand with a threshold S0 corresponding to a variable magnetic field received (control of the communication zone ZO on reception).

In the first case (fixed threshold), when the duty ratio α0 of the symmetric voltage U0 is variable, it suffices to perform current feedback control in orTRD to determine the duty ratio to be applied subsequently which will make it possible to obtain a current flowing in the antennas device corresponding to the fixed threshold S0 of the badge ID. The same holds with duty ratio α0 which is at the start equal to 1/3.

In the second case (variable threshold), the duty ratio α0 is fixed so as to obtain a theoretical current Ith corresponding to the nominal communication zone. After each measurement of the actual current I flowing in the antennas device corresponding to the nominal communication zone, it suffices to calculate the threshold S0 on the basis of this actual current and to send it to the badge ID. A comparison is performed between the magnetic field received by the badge ID which is situated at a certain position and the updated threshold. In this second case also, when the duty ratio α0 is equal to 1/3, it suffices to adjust the theoretical current Ith corresponding to the nominal communication zone with the RLC or RL filter of the antennas device, for example by taking an appropriate resistance value R. Then, the remainTRD (measurement of the actual current, sending of the corresponding threshold to the badge ID, comparison with the updated threshold) is performed as described previously.

Thus, accurate measurement of the current flowing in the antennas device A makes it possible to obtain an accurate measurement of the actual power transmitted Pe (which takes into account the possible variations in its impedance Z) and to adjust the antennas device to a power transmitted Pe corresponding exactly to the threshold S0 of the badge ID when it lies at the limit of the communication zone ZO. The antennas device A and the badge ID can thus communicate without risk of error. And within the framework of an application such as a hands-free system, the detection of the badge ID can be performed without errors.

It will be noted that FIG. 8 illustrates the method implemented by the transmission-reception device TRD, namely:

sending a symmetric voltage signal U0 as input to the antennas device A so as to provide it with a current making it possible to generate the magnetic field emitted, and measuring the current flowing in the antennas device A.

It will be noted that the examples have been taken with an antennas device A transmitting low-frequency signals and an identification object ID transmitting radiofrequency signals, but of course other examples may be taken with transmissions of signals at other frequencies.

Thus the invention exhibits the following advantages:
it makes it possible to accurately determine the value of the power transmitted and therefore the value of the magnetic field emitted corresponding to the magnetic field received,
this determination is performed simply by means of a current measurement and thus avoids complex voltage feedback control.

The invention claimed is:

1. A signal transmission-reception device (TRD) configured to cooperate with an antenna device that emits a magnetic field, wherein the signal transmission-reception device comprises, for transmission:
    a power stage for sending a symmetric square voltage signal as input to the antenna device so as to provide the antenna device with a current for generating the magnetic field emitted, and
    a current measurement stage for measuring the current flowing in the antenna device.

2. The transmission-reception device (TRD) as claimed in claim 1, wherein the voltage signal comprises a duty ratio of 1/3.

3. The transmission-reception device (TRD) as claimed in claim 1, wherein the power stage is with complete-bridge control.

4. The transmission-reception device (TRD) as claimed in claim 1, wherein the measurement stage is a peak detector.

5. The transmission-reception device (TRD) as claimed in claim 1, wherein the antenna device is an RLC circuit.

6. A signal transmission-reception system (SYS) comprising an antenna device and a transmission-reception device (TRD) as claimed in claim 1, wherein the transmission-reception device is configured to cooperate with the antenna device.

7. The transmission-reception system (SYS) as claimed in claim 6, wherein the antenna device is an RLC circuit.

8. A method of transmitting-receiving signals bound for an antenna device, comprising:
    sending a symmetric square voltage signal as input to the antenna device provide the antenna device with a current for generating a magnetic field emitted by the antenna device, and
    measuring the current flowing in the antenna device.

9. A motor vehicle comprising a transmission-reception device (TRD) as claimed in claim 1, wherein the transmission-reception device is configured to cooperate with an antenna device.

* * * * *